United States Patent [19]

Iseler et al.

[11] Patent Number: 5,130,071

[45] Date of Patent: Jul. 14, 1992

[54] VACUUM COMPRESSION MOLDING METHOD USING PREHEATED CHARGE

[75] Inventors: Kenneth A. Iseler, Richmond; Robert E. Wilkinson, Birmingham, both of Mich.

[73] Assignee: The Budd Company, Troy, Mich.

[21] Appl. No.: 581,089

[22] Filed: Sep. 11, 1990

Related U.S. Application Data

[63] Continuation of Ser. No. 841,195, Mar. 19, 1986, abandoned, which is a continuation-in-part of Ser. No. 640,470, Aug. 13, 1984, Pat. No. 4,612,149, which is a continuation-in-part of Ser. No. 488,494, Apr. 25, 1983, Pat. No. 4,488,862.

[51] Int. Cl.$^5$ .............................................. B29C 43/56
[52] U.S. Cl. ...................... 264/102; 264/129; 264/257; 264/258; 425/112; 425/388; 425/420
[58] Field of Search ............... 264/101, 102, 255, 247, 264/263, 325, 257, 258, 129; 425/405 R, 112, 503, 504, 388, 346, 347, 412, 420, 423, 405.1, 405.2

[56] References Cited

U.S. PATENT DOCUMENTS

| | | | |
|---|---|---|---|
| 2,452,382 | 10/1948 | Long | 425/405.1 |
| 3,041,058 | 6/1962 | Straumann et al. | 425/405.1 |
| 3,504,070 | 3/1970 | Zaharski | 264/89 |
| 3,840,239 | 10/1974 | Frazekas et al. | 425/388 |
| 3,871,060 | 3/1975 | Ladney, Jr. | 264/338 |
| 3,903,343 | 9/1975 | Pfaff | 264/255 |
| 3,957,943 | 5/1976 | Ogura | 264/245 |
| 3,959,434 | 5/1976 | Squier | 264/255 |
| 3,997,286 | 12/1976 | Gabrys | 264/255 |
| 4,067,845 | 1/1978 | Epel et al. | 264/255 |
| 4,076,780 | 2/1978 | Ditto | 264/325 |
| 4,076,788 | 2/1978 | Ditto | 264/255 |
| 4,081,578 | 3/1978 | van Essen et al. | 264/255 |
| 4,092,393 | 5/1978 | Marocco | 264/102 |
| 4,204,822 | 5/1980 | Hewitt | 264/102 |
| 4,267,142 | 5/1981 | Lankheet | 264/102 |
| 4,290,838 | 9/1981 | Reaville | 425/405.1 |
| 4,353,857 | 10/1982 | Ray et al. | 264/258 |
| 4,367,192 | 1/1983 | Arnason | 264/255 |
| 4,374,080 | 2/1983 | Schroeder | 264/255 |
| 4,404,261 | 9/1983 | Canning et al. | 264/255 X |
| 4,416,841 | 11/1983 | Corea et al. | 264/102 |
| 4,423,191 | 12/1983 | Haven et al. | 264/255 |
| 4,438,062 | 3/1984 | Griffith et al. | 264/255 |
| 4,488,862 | 12/1984 | Epel et al. | 156/382 |
| 4,489,031 | 12/1984 | Ogihara | 264/325 |
| 4,524,043 | 6/1985 | McDougal | 264/DIG. 42 X |
| 4,551,085 | 11/1985 | Epel et al. | 425/405.1 |
| 4,578,448 | 3/1986 | Brode et al. | 425/543 X |
| 4,597,929 | 7/1986 | Blayne | 264/255 |
| 4,612,149 | 9/1986 | Iseler et al. | 264/325 |
| 4,622,354 | 11/1986 | Iseler et al. | 264/102 |
| 4,652,498 | 3/1987 | Wolf et al. | 428/461 |
| 4,855,097 | 8/1989 | Iseler et al. | 264/102 |

FOREIGN PATENT DOCUMENTS

| | | |
|---|---|---|
| 0001865 | 6/1979 | European Pat. Off. |
| 0003718 | 8/1979 | European Pat. Off. |
| 0033638 | 8/1981 | European Pat. Off. |
| 1909896 | 9/1970 | Fed. Rep. of Germany |
| 1629450 | 2/1971 | Fed. Rep. of Germany |
| 2247047 | 4/1974 | Fed. Rep. of Germany |
| 2197644 | 3/1974 | France |
| 57-175617 | 2/1982 | Japan |
| 58-1522 | 1/1983 | Japan |
| 59-79328 | 5/1984 | Japan |
| 62-63663 | 7/1986 | Japan |
| 8404273 | 11/1984 | PCT Int'l Appl. |

OTHER PUBLICATIONS

J. D. Gorsuch et al., "Surface Porosity and Smoothness of SMC Molding as Affected by Vacuum and Other Molding Variables", 33rd Annual Technical Conference, 1978, Reinforced Plastics/Composites Institute, (List continued on next page.)

Primary Examiner—Jay H. Woo
Assistant Examiner—Jeremiah F. Durkin, II
Attorney, Agent, or Firm—Harness, Dickey & Pierce

[57] ABSTRACT

Sheet molded compound (SMC) charges are preheated before being molded into exterior automotive body panels using compression molding techniques under vacuum.

13 Claims, 2 Drawing Sheets

OTHER PUBLICATIONS the Society of the Plastics Industry, Inc., Section 9-F, pp. 1-7.

SPI Handbook of Technology and Engineering of Reinforced Plastics/Composites, 2nd Ed, 1973, J. G. Mohr editor, pp. 158, 206, 222-228 (including flanking pp. 157, 159, 205, 207, 221 and 229).

SPI Handbook of Technology and Engineering of Reinforced Plastics/Composites, 2nd Ed, 1973, J. G. Mohr editor, p. 222.

Japanese Pat. Disclosure No. 55-158952, Appl. No. 54-66998 (Abstract Translation), Jan. 6, 1983.

Japanese Pat. Disclosure No. 38-10042, Appl. No. 36-46011 (Abstract Translation), Jul. 1966.

Japanese Pat. Disclosure No. 57-187212, Appl. No. 56-70986 (Abstract Translation), May 1985.

Japanese Pat. Disclosure No. 57-187212, Appl. No. 56-70986 (Abstract Translation), May 1985.

Iseler and Wilkinson, 39th Annual Conference, Reinforced Plastics/Composites Institute, The Society of the Plastics Industry, Inc., "A Surface Evaluation System for Class A Applications", Jan. 16-19, 1984, (4 pages).

K. Demmler et al., Kunststoffe "Zur Struktur von Formstoffen und PreBteilen aus schrumpfarm eingestellten ungesattigten Polyesterharzen", pp. 781-786, vol. 66, No. 12, 1976.

Herstellieng, et al., *Kunststoff-Handbuch Band VIII,* "Polyester", p. 717, 1973, (2 pages).

F. J. Amphthor, 33rd Annual Technical Conference, 1978, Reinforced Plastics/Composites Institute, The Society of Plastic Industry, Inc., "Sink Reduction Techniques for SMC Molding", (5 pages).

Jutte (Paper 730171) SAE, Jan. 12, 1973, "SMC—Sink Mechanisms and Techniques of Minimizing Sink", (12 pages).

International Harvester Engineering Report #115, Jan. 13, 1976, "Evaluation of Fiberglass Sheet Molding Compound", p. 3, (3 pages).

Owens-Corning Fiberglas' Publication No. 5-T-M-69-91-A, p. 38, May 1986, (2 pages).

Isham, "Preventing Porosity in SMC Panels", SPE/PIAD—Detroit Section Regional Technical Conference, Detroit, Mich., Apr. 1, 1985.

"Porosity in SMC—Studies Show It Can Be Licked!", Technical News Bureau, Inc., undated, 11 pages, Jan. 3, 1985.

Transcript text from Videotape: Porosity Program; Aug. 2, 1984.

Memo from David L. Schweikert dated May 11, 1984.

Owens-Corning Fiberglass Memo Report, "Evaluation of the Effect of Some SMC Sheet Manufacturing and Molding Variables on Porosity", Jan. 16, 1984, 17 pages.

Owens-Corning Fiberglas Memo Report, "Reduction of Porosity in SMC Panels", Apr. 10, 1984, 12 pages.

Owens-Corning Fiberglas Memo Report, "Status Report—Porosity Elimination", Apr. 13, 1984.

Keegan, "Proper Mold Venting Is One Answer to Costly Parts Rejection", *Plastics Engineering Magazine,* Aug. 1978.

Jutte, "Structural SMC: Material, Process and Performance Review", SPI Annual Technical Conference, 1978.

Denton, "Mechanical Properties Characterization of an SMC-R50 Composite", SPI Annual Technical Conference, 1979.

Monk, *Thermosetting Plastics,* Chpts. 2, 3, 6 & 8, published by George Godwin Limited, 1981.

Owens-Corning Fiberglas Corporation Technical Paper entitled "Reducing SMC Porosity—Studies Show It Can Be Done", pp. 1-6, Jan. 3, 1985.

VACUUM COMPRESSION MOLDING METHOD USING PREHEATED CHARGE

This is a continuation of U.S. application Ser. No. 841,195, filed Mar. 19, 1986, entitled "Vacuum Compression Molding Using Preheated Charge," now abandoned, which is a continuation-in-part application of U.S. Ser. No. 640,470, filed Aug. 13, 1984, entitled "Compression Molding a Charge Using Vacuum," now U.S. Pat. No. 4,612,149, issued Sep. 16, 1986, which is a continuation-in-part application of U.S. application Ser. No. 488,494, filed Apr. 25, 1983, entitled "Compression Molding Apparatus Having Vacuum Chamber," now U.S. Pat. No. 4,488,862, issued Dec. 18, 1984.

TECHNICAL FIELD

This invention relates to compression molding and, more particularly, to techniques for compression molding a charge using vacuum.

BACKGROUND

By way of background, compression molding is a technique often used to make fiber reinforced plastic (FRP) parts. A charge containing a curable resin is placed between upper and lower heated die members defining a mold cavity. The dies are then brought to a closed position where the dies compress the charge causing it to flow and fill the mold cavity. After the resin cures, the molds are opened and the finished part removed.

Compression molding techniques have been used to make parts having relatively flat surfaces, such as exterior automotive body panels. The charges used for making such parts generally consist of a thermosetting resin containing reinforcing fibers and various fillers. The charges are often formed into sheets known in the art as sheet molding compound (SMC). Unfortunately, problems have been experienced in the past in consistently providing molded parts with extremely smooth surface finishes as is demanded by the automotive industry. It is believed that an uneven filling rate of the charge within the mold can cause air to be entrapped within the molded part thereby resulting in substantial porosity. This uneven filling can also cause insufficient dispersion of the constituents within the mold. The porosity and non-uniform distribution, particularly of reinforcement fibers, can cause surface problems. Air entrapment between layers can also create blistering of the part resulting in a lack of durability.

According to the discussion in the 1974 U.S. Pat. No. 3,840,239 to Fazekas et al there have been a variety of methods that have been tried in order to reduce surface defects. Among them include: a) experimenting with different ranges of plasticity; b) increasing the molding pressure; c) lowering the temperature of the mold; d) closing the mold faster and applying a high pressure sooner; e) preheating the charges of molding compound; f) experimenting with different charge weights; g) trying a higher density molding compound to obtain greater "back pressure" in the mold; h) breathe the mold earlier; and i) use the semi-positive molds. The patentee in the '239 patents reports that none of the above methods have provided any real success in the attempt to eliminate porosity.

Another method used to avoid entrapped air was to use a relatively thick charge that covers a relatively small area of the molding surface. The idea was to attempt to "squeeze" the air out of the charge by slowly closing the molds. Preheating the charge tended to be counterproductive because it was often necessary to lower the temperature of the heated dies since the charge would otherwise gel before it could flow and fill the mold. Consequently, preheating SMC charges did not appear to provide any substantial benefits.

In recent years, it has been common to use what is known as an "in-mold coating" technique to provide fiber reinforced plastic (FRP) parts with a commercially acceptable smooth finish. This "in-mold coating" technique is disclosed, for example, in U.S. Pat. No. 4,081,578 to van Essen et al. Briefly, this method employs an additional processing step where the cured part remains in the mold and is coated with a composition that spreads and penetrates the surface to fill the pores and voids therein. Unfortunately, this technique has several drawbacks. For example, the additional coating operation consumes valuable machine time and lessens the amount of production which can be gained from a single mold. Relatively sophisticated and expensive mechanisms must be utilized to control the application of the coating to the part surface, and care must be taken to ensure that the coating will properly bond to the surface of the part.

The use of vacuum during the compression molding process has been recorded in the literature such as the '239 patent to Fazekas referenced above and the article by Gorsuch et al, entitled "Surface Porosity and Smoothness of SMC Molding as Affected by Vacuum and Other Molding Variables", 33rd Annual Technical Conference, 1978, Reinforced Plastics/Composites Institute, The Society of the Plastics Industry, Inc., Section 9-F, pages 1-7. More recently, the assignee of the present invention has utilized vacuum in successfully molding acceptable parts without the need for the "in-mold coating" technique. See, for example, U.S. Pat. Nos. 4,488,862; 4,551,085 and U.S. patent application Ser. No. 640,470 entitled "Compression Molding a Charge Using Vacuum" by Iseler et al, now U.S. Pat. No. 4,612,149.

SUMMARY OF THE INVENTION

Pursuant to the present invention, a method is disclosed for making a part with a smooth surface by compression molding a charge containing a curable resin. The method includes the steps of preheating the charge prior to placement thereof into the mold. The mold dies are then moved towards a partially closed condition where the mold cavity is evacuated while the other die remains spaced from the charge. Then, the dies are quickly closed to cause the charge to spread and fill the cavity before the charge undergoes a substantial increase of viscosity or "gels". After the resin cures, the dies are opened and the part removed from the mold.

Among the advantages of the present invention is that the processing time required in order to mold the part is substantially decreased. This provides a very important commercial advantage since the same machine can produce more parts thereby reducing costs. These advantages are all obtained without sacrificing part quality.

BRIEF DESCRIPTION OF THE DRAWINGS

The various advantages of the present invention will become apparent to one skilled in the art by reading the following specification and by reference to the drawings in which.

DESCRIPTION OF THE PREFERRED EMBODIMENT

Figure 1:
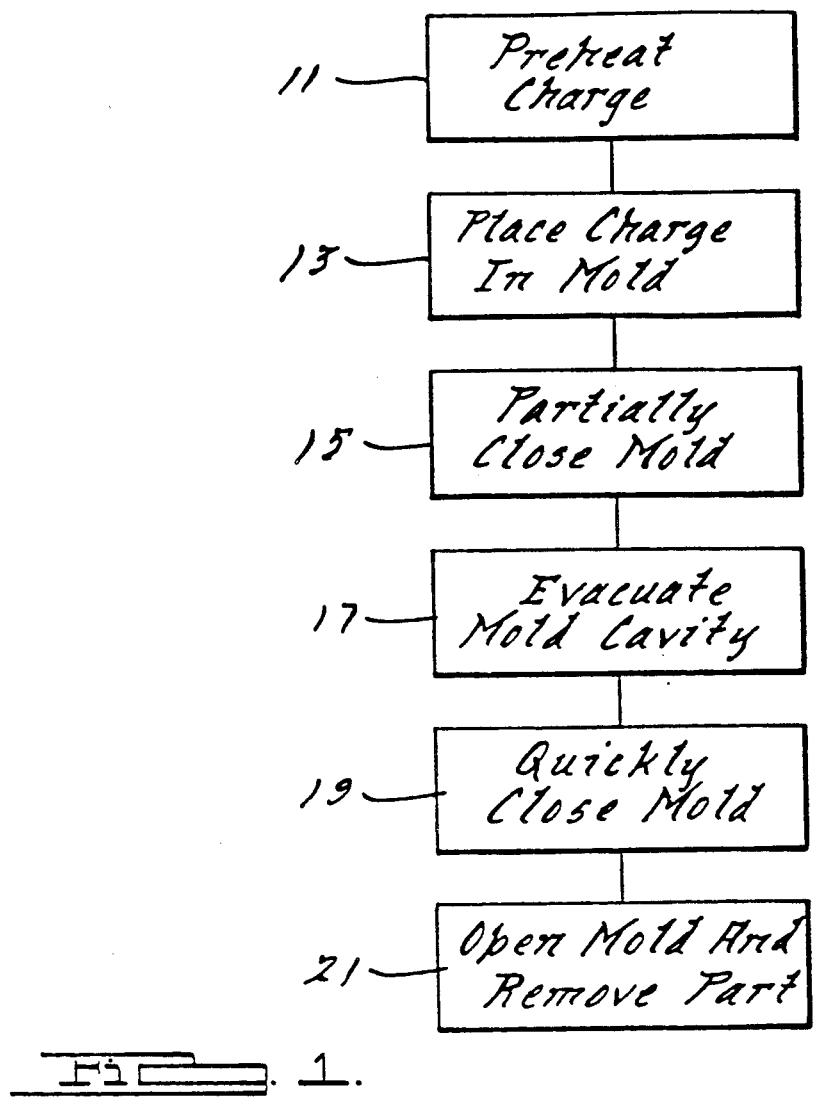
FIG. 1 is a flow charge illustrating the preferred steps in carrying out the method of the present invention.

The present invention has particular utility for making a part from an SMC charge. For purposes of this invention, an SMC charge is a material containing a thermosetting resin and reinforcing fibers, with the resin being of the type that uses free radical curing, i.e., a resin that has monomers that polymerize quickly upon reaching a given curing temperature. Typical SMC resins include polyester resins that are generally blends of unsaturated polyester resins and cross-linkable monomers such as styrene. Examples of commercially available SMC material include "Class A2000" SMC from The Budd Company, "Permiglas" SMC from Premix Inc.; and "Smooth Surface" SMC from Owens-Corning Fiberglass. Additional examples of suitable SMC charges are disclosed in the aforementioned '578 patent to van Essen et al, U.S. Pat. Nos. 4,067,845 and 4,260,538, as well as commonly assigned U.S. Pat. No. 4,535,110 and U.S. Ser. No. 790,096 to Iseler et al, filed Oct. 22, 1985 entitled "Phase Stabilized Polyester Molding Material", now U.S. Pat. No. 4,622,354 which are hereby incorporated by reference.

According to the present invention, the SMC sheets are preheated prior to being molded. This preheating step is represented as Step 11 in FIG. 1. The SMC material is heated to a temperature of between 120–180 degrees F. It is believed that preheat temperatures below 120 degrees F. will not be particularly advantageous because the low temperature will not provide any significant effect on curing or flow of the charge. Conversely, it is believed that preheating the SMC charge to temperatures above 180 degrees F. is not advantageous because there may not be sufficient time for the charge to flow in the mold cavity before it gels.

The preheating step can be accomplished in a variety of manners such as by placing the SMC charge into an oven. However, dielectric heating of the SMC is presently preferred because the charge is heated by way of molecular movement thereby providing an even temperature rise throughout the charge within a short time frame. A dielectric heater generally consists of two plates or electrodes connected to a source of radio frequency energy. The charge is placed between the two plates and is subjected to the RF field which generates heat by molecular friction due to the rapid alternation of the RF energy, typically at 70–80 million cycles per second. A suitable commercially available dielectric heater is available from W. T. LaRose and Associates, Inc. as Model No. 67FMC.

With additional reference to FIG. 2, the preheated charge is then placed into the mold which is generally designated by the numeral 12. Mold 12 has an upper die 14 and a lower die 16. Lower die 16 is mounted on a fixed bed (not shown) whereas upper die 14 is connected to a moveable platen 18 operating under the action of a ram 20 or the like to control relative movement between the two dies. The manner of controlling the die movement is well within the skill of the ordinary practitioner and need not be described in detail herein.

Figure 3:
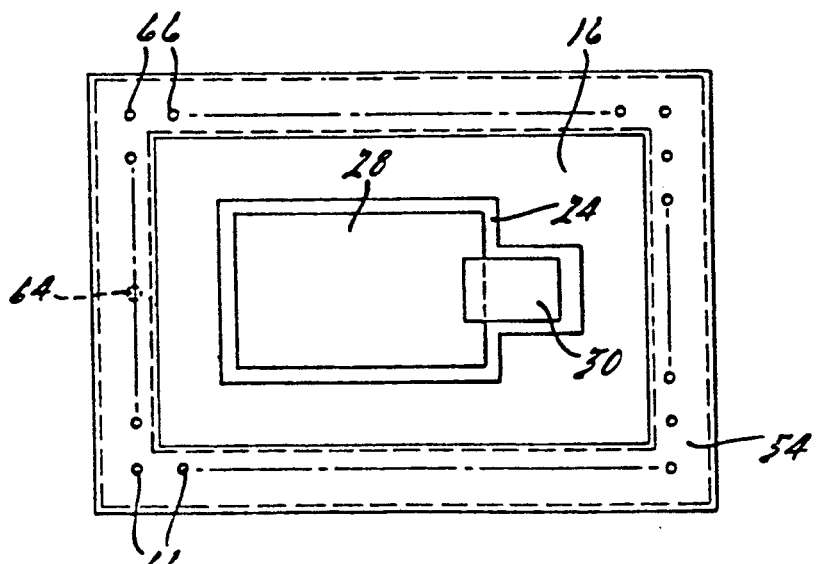
FIG. 3 is a plan view as viewed along the lines 3—3 of FIG. 2(A) illustrating the charge coverage on the molding surface of the lower die.

The upper die 14 has a female molding surface 22 whereas the lower die has a male molding surface 24. Molding surfaces 22 and 24 cooperate to define a mold cavity having a shape corresponding to the desired shape of the part to be made. The shape of the molding surface will, of course, vary depending upon the configuration of the final part. However, the present invention is well suited for forming parts having relatively large and generally flat surfaces having surface areas larger than one square foot. Nonlimiting examples of such types of parts include exterior automotive body panels such as hoods, deck lids, roofs and the like. FIG. 3 schematically illustrates the outline of the molding surface 24 for a lower die 16 designed to mold an automotive body panel of these types. For purposes of this invention, a molding surface is a surface of one die member which cooperates with an opposing surface on another die member to form a mold cavity.

Figure 2A:
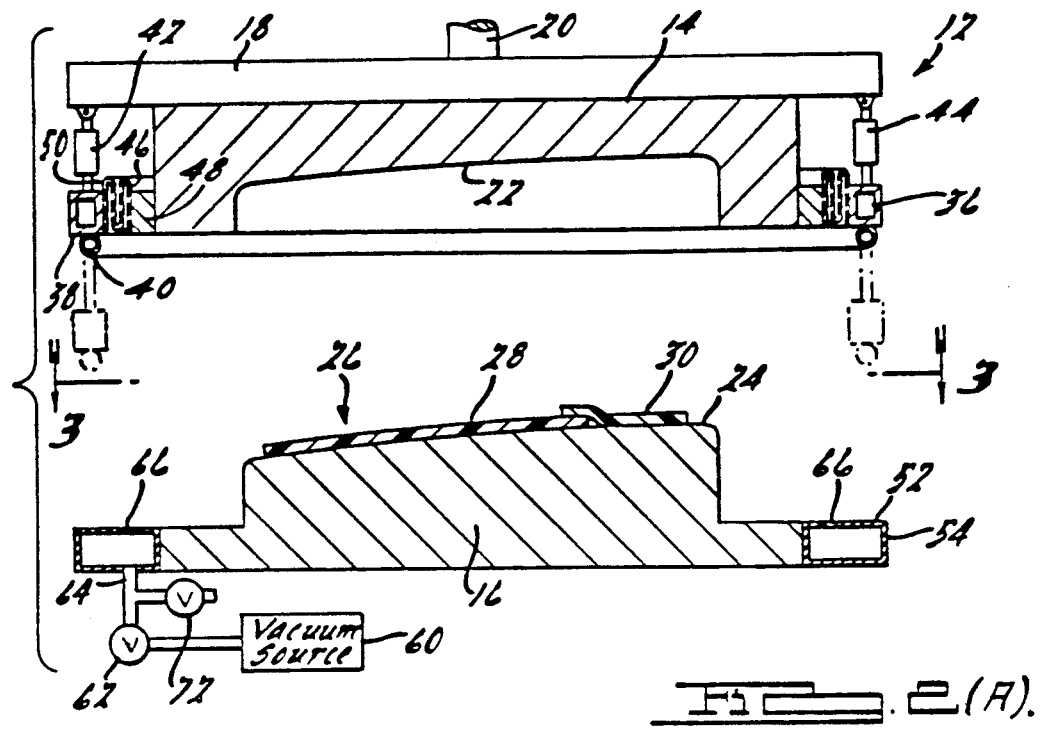
FIGS. 2A, 2B and 2C are cross sectional views of the mold during various steps in the molding process.

In the open position as shown in FIG. 2(A), the dies 14 and 16 are spaced apart a sufficient distance to allow the preheated charge 26 to be placed on the molding surface 24 of the lower die 16 as represented by step 13 in FIG. 1. In this particular example, charge 26 takes the form of two sheets 28 and 30 of SMC material. Sheets 28 and 30 are laid on molding surface 24 preferably so that the charge covers 40–80 percent of the total surface of the molding surface 24. As mentioned in the above commonly assigned U.S. Pat. No. 4,612,149, charge coverage of less than 40 percent or greater than 80 percent is believed to cause an unacceptable increase in the surface waviness and in imperfections of the finished part. For most exterior automotive body panels the preferred range is 50–75 percent charge coverage. As is within the knowledge of the ordinary practitioner, the thickness, weight and placement of the charge on the molding surface will vary depending upon the configuration of the final part. In general, the charge should be generally centrally located with little or no space being left between individual sheets if more than one is used, as represented by the slight overlap between sheets 28 and 30. Each of the illustrated sheets 28 and 30 of charge 26 preferably consist of 1–4 plies of SMC material stacked on one another, each ply being about $\frac{1}{8}-\frac{1}{4}$" thick. This is in contrast to some typical procedures where 6–10 plies are used to make up a much thicker charge covering only about 25 percent of the surface area. As noted in the background portion of this invention such prior techniques were probably based on the belief that it was necessary to use a slow closing of the mold to "squeeze out" any trapped air within the charge.

Figure 2B:
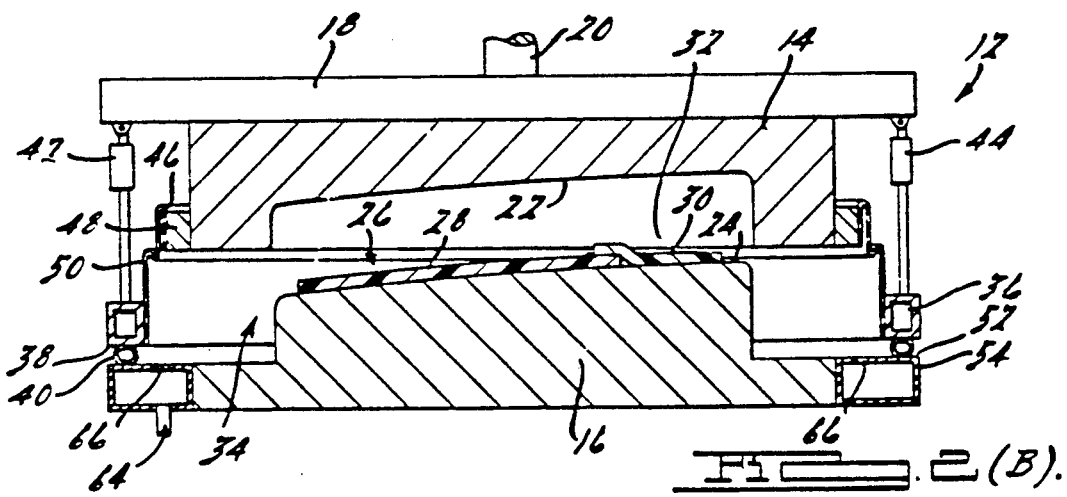

Once the charge 26 is placed on the mold, the next step is to move the molds to a partially closed position as shown in FIG. 2(B). In the partially closed position, the mold cavity is essentially defined by the dies but the upper die remains spaced from the charge 26. In addition, a sealed vacuum chamber 34 surrounding mold cavity 32 is created when the upper seal hose 40 contacts the lower seal ring 52. The spacing between the dies in the partially closed position should be kept as small as possible so as to minimize the volume that needs to be evacuated. A spacing of several inches is generally satisfactory.

The preferred molding apparatus includes an annular ring 36 surrounding upper die 14. Ring 36 takes the form of rectangular metal tubing in this embodiment adapted to present a generally horizontal flat surface 38 on lower portions thereof. Ring 36 is free to move relative to upper die 14 under the action of a plurality of pneumatically or hydraulically actuated cylinders. Two cylinders 42 and 44 are shown in the drawings. Normally, when the mold is open the cylinders are extended as shown in the phantom lines in FIG. 2(A). A flexible diaphragm or bellows 46 has its inner edge rigidly connected to the periphery of the die 14 via flange member 48, while the outer edge of bellows 46 is connected to flange 50 extending from ring 36.

To arrive at the position shown in FIG. 2(B), the ram 20 is actuated to move the upper die 14 to the partially closed position where the hose seal 40 contacts ring 52. Thus, the vacuum chamber 34 is defined by upper die 14, bellows 46, sealing ring 36, hose 40 serving as a compression seal, member 54 and lower die 16. The downward force provided by cylinders 42, 44 serves to ensure that a consistently reliable seal is provided around the mold cavity 32. In addition, the cylinders can be used to move ring 36 upwardly (as shown in FIG. 2(A)) relative to the upper die 14 to permit easy access to the die for purposes of cleaning and installation, as well as for other reasons that easy access is advantageous.

Once the chamber 34 has been sealed, the next step is to evacuate the mold cavity as represented by the step 17 in FIG. 1. Best results are obtained by drawing as good a vacuum within chamber 34 as possible within the shortest time possible. There appears to be no lower limits with respect to the degree of vacuum (0 inches mercury absolute or about 30 inches mercury gauge being a theoretical perfect vacuum) and the time in which it must be obtained. The upper limit for the vacuum appears to be about 10 inches of mercury absolute (about 20 inches mercury gauge) because vacuums worse than this can leave too much air in the chamber 34 and the charge thereby resulting in imperfections such as blisters or surface pits.

Satisfactory results have been obtained by drawing the vacuum within the mold cavity to at least ten inches of mercury absolute within a period of less than 10 seconds. It is believed that the vacuum must be drawn within at least 15 seconds; otherwise an unacceptable loss of monomer can occur resulting in bad looking parts and/or surface defects. Preferably, a vacuum of five inches of mercury absolute is drawn within five seconds after the dies have reached their partially closed position. This can be accomplished by way of a vacuum source 60 which is connected via valve 62 to the vacuum chamber 34. Preferably, vacuum source 60 consists of a plurality of previously evacuated tanks (not shown) that are sequentially connected to the vacuum chamber 34. A relatively large pipe 64 is connected to the hollow tubing 54 which includes a plurality of openings 66 on inboard regions of its surface 52. Thus, fluid connection is established between the vacuum tanks and the chamber 34. The dual use of the hollow tubing 54 as part of the vacuum sealing arrangement (via surface 52) and as a relatively large conduit for pulling the vacuum is a particularly advantageous construction.

Figure 2C:
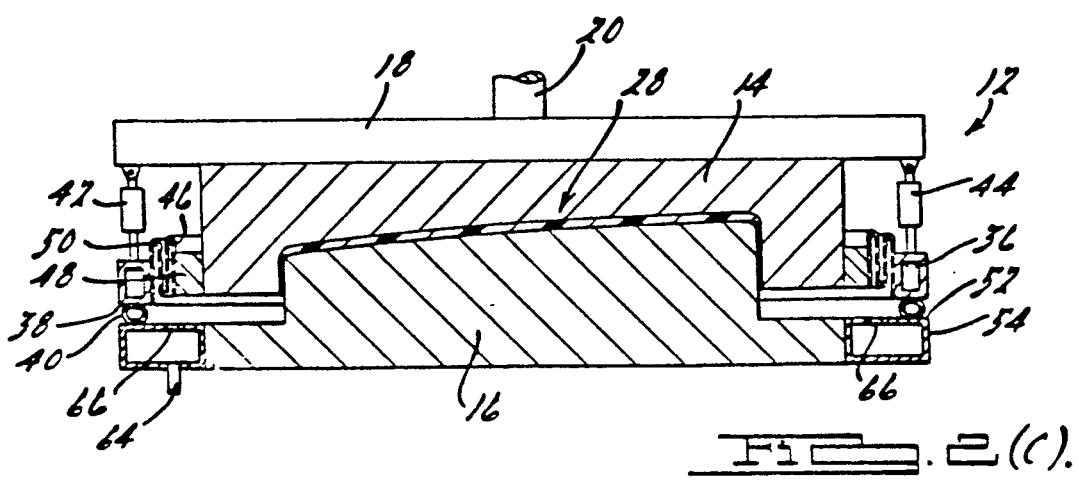

Once the mold cavity has been evacuated, the upper die begins to move towards the fully closed position which is shown in FIG. 2(C). During the mold closing step, the upper die contacts the charge 26 thereby transferring the heat from the die and applying pressure to the charge causing it to spread and fill the mold cavity 34. It is important that the upper die is moved downwardly very quickly. Otherwise, the charge may not sufficiently flow to completely fill the mold cavity before it gels, i.e., when the charge exhibits a dramatic increase in viscosity due to the free radical cross linking of the monomers with the resin. Polyester resins of the type typically used in SMC charges tend to cure very quickly when the resin achieves its curing temperature which is generally between 250 and 350 degrees F. The speed of the mold closing step will vary somewhat depending upon the size and placement of the charge on the mold. However, the mold should be fully closed within at least 15 seconds after the mold cavity is evacuated, i.e., below at least 10 inches of mercury absolute.

In one particular example, a charge in the form of several plies of SMC material of the type disclosed in the aforementioned patent application Ser. No. 790,097 to Iseler et al is preheated in a dielectric heater to a temperature of about 170 degrees F. The preheated charge is placed on the lower die which is arranged to form a mold cavity in conjunction with the upper die that corresponds to the shape of a deck lid for the Pontiac Fiero automobile. Within 2 seconds after placement of the charge on the dies (which are heated to about 300 degrees F.) the upper die is closed to the position shown in FIG. 2(B). Within 5 seconds, the mold cavity is evacuated to a vacuum of about 3 inches of mercury absolute. Then, the upper die is quickly brought to the fully closed position shown in FIG. 2(C) within about 2–8 seconds. The dies apply about 1000–1500 psi to the charge and remain in the closed position for about 45 seconds at which time the mold is opened and the part removed.

From the foregoing it can be appreciated that the entire molding cycle can be substantially decreased thereby resulting in very significant manufacturing economies. In fact, it is believed that quality parts can be produced according to this method even though the mold dies remain in their fully closed position for no more than 30 seconds. While this invention has been described in connection with particular examples thereof, those skilled in the art will appreciate that other modifications are within the scope of this invention after reading the specification, studying the drawings and by reading the following claims.

What is claimed is:
1. A method comprising:
a) making a part with a large smooth surface area by compression molding a charge containing a thermosetting resin;
b) preheating the charge to a temperature of between about 120 and 180 degrees F.;
c) opening a mold having an upper die and a lower die with opposing molding surfaces that cooperate to define a mold cavity having a shape corresponding to the desired shape of the part, one of said dies having a generally smooth surface;
d) placing the preheated charge on the molding surface of one of the dies;
e) moving the dies toward each other to a partially closed condition where an area surrounding the mold cavity is sealed and the other die remain spaced from the charge;
f) evacuating the mold cavity;
g) closing the mold to a fully closed position in about 15 seconds or less from evacuation so that the dies compress the charge to cause it to fill the mold cavity before the resin gels;
h) maintaining the dies in a closed position for a sufficient period of time to allow the resin to cure and from a part having at least one relatively large smooth surface; and i) opening the dies and removing the part.

2. The method of claim 1 wherein the charge comprises sheet molding compound containing a polyester resin and reinforcing glass fibers therein.

3. The method of claim 2 wherein the mold cavity is evacuated in step e) to at least about 10 inches of mercury absolute within the period of less then about 10 seconds.

4. A method of making an automotive exterior body panel characterized by generally flat surface having a surface area exceeding about two square feet which is desired to have a smooth finish, said method comprising:

a) preheating a sheet molded compound charge containing a thermosetting polyester resin and glass fibers therein to a temperature of between about 120 and 180 degrees F.;

b) providing a mold having an upper die and a lower die with opposing molding surfaces cooperating to define a mold cavity having a shape corresponding to the desired shape of the panel;

c) placing the preheated charge on the molding surface of the lower dies so that the charge covers about 40-80 percent of the surface area of the molding surface;

d) moving the dies toward each other to a partially closed condition where an area including the mold cavity is sealed but the other die remains spaced from the charge;

e) evacuating the mold cavity to at least about five inches of mercury absolute within a period of less than about five seconds;

f) closing the mold to a fully closed position within a period of about 2-8 seconds to thereby cause the charge to flow and fill the cavity before the resin gels;

g) heating the charge to about 250 to 350 degrees F. by heating the dies which apply a pressure of between about 1000-1500 psi to the charge; and h) maintaining the dies in the closed position for no more than about 45 seconds before opening the dies and removing the panel.

5. The method of claim 4 wherein the charge covers about 50-75 percent of the molding surface of one of the dies.

6. A method of making a plastic part with a large surface so that the surface is extremely smooth while the part remains structurally strong, said method comprising:

a) opening a mold having an upper die and a lower die with opposing molding surfaces that cooperate to define a mold cavity having a shape corresponding to the desired shape of the part, the major portion of at least one of the dies having a large, smooth surface; said mold further including a sealing ring surrounding the upper die;

b) preheating a charge containing plastic resin to about 120-180 degrees F.;

c) placing the charge on the molding surface of one of the dies so that the charge covers about 40-80 percent of the surface area of the molding surface;

d) lowering the upper die and sealing ring toward the lower die to a partially closed position where the sealing ring provides a vacuum seal around the mold cavity while the upper die remains spaced from the charge;

e) evacuating the mold cavity;

f) lowering the upper die to a fully closed position within at least about 15 seconds of providing the vacuum sealing in step (d) so that the upper die compresses the charge causing the charge to flow and fill the mold cavity;

g) allowing the resin to solidify; and h) opening the dies and removing the part.

7. The method of claim 6 wherein the mold cavity is evacuated to at least about 10 inches of mercury absolute within a period of less than about 10 seconds measured from the time that the sealing ring provides the vacuum seal surrounding the mold cavity.

8. The method of claim 6 which further comprises painting the large surface of the part.

9. The method of claim 8 wherein the paint is applied directly to the part surface.

10. The method of claim 8 wherein the part surface has a surface area exceeding about two square feet.

11. The method of claim 10 wherein the part is an exterior automotive body panel.

12. A method of making a structurally strong part having a large surface, said method comprising:

opening a mold having an upper die and a lower die with opposing molding surfaces that cooperate to define a mold cavity having a shape corresponding to the desired shape of the part;

preheating at least one ply of a molding compound containing thermosetting resin and reinforcing fibers therein to about 120 to 180 degrees F.;

placing the preheated charge on the molding surface of one of the dies;

moving the dies toward each other to a partially closed position where an area surrounding the mold cavity is sealed and other die remains spaced from the charge;

evacuating the mold cavity to at least about 10 inches of mercury absolute within a period of less than about 10 seconds;

quickly closing the mold to a fully closed position so that the dies compress the charge to cause it to fill the mold cavity before the resin gels;

applying heat and pressure from the dies to the charge for a sufficient period of time to allow the resin to cure.

13. The method of claim 12 wherein the mold is evacuated to at least about 5 inches of mercury absolute within a period of less than about 5 seconds.

* * * * *